(12) United States Patent
Sullivan

(10) Patent No.: US 8,490,407 B2
(45) Date of Patent: Jul. 23, 2013

(54) SYSTEM AND METHOD FOR GENERATION OF HIGH PRESSURE AIR IN AN INTEGRATED GASIFICATION COMBINED CYCLE SYSTEM

(75) Inventor: Terrence B. Sullivan, Orlando, FL (US)

(73) Assignee: Siemens Energy, Inc., Orlando, FL (US)

( * ) Notice: Subject to any disclaimer, the term of this patent is extended or adjusted under 35 U.S.C. 154(b) by 0 days.

(21) Appl. No.: 13/105,992

(22) Filed: May 12, 2011

(65) Prior Publication Data
US 2011/0214432 A1 Sep. 8, 2011

Related U.S. Application Data

(62) Division of application No. 11/600,708, filed on Nov. 16, 2006, now Pat. No. 7,947,115.

(51) Int. Cl.
*F02C 6/18* (2006.01)
*F02C 3/22* (2006.01)

(52) U.S. Cl.
USPC .......................................... 60/780; 60/39.465

(58) Field of Classification Search
USPC ........... 95/54; 96/130, 138; 60/39.12, 39.464, 60/39.465, 781, 780
See application file for complete search history.

(56) References Cited

U.S. PATENT DOCUMENTS

| | | | | |
|---|---|---|---|---|
| 5,979,183 A | * | 11/1999 | Smith et al. | 62/650 |
| 2004/0011057 A1 | * | 1/2004 | Huber | 60/781 |

* cited by examiner

*Primary Examiner* — Gerald L Sung

(57) ABSTRACT

An integrated gasification combined cycle system. In one embodiment (FIG. 2) a system (200) includes an ion transport membrane air separation unit (210) for producing oxygen-enriched gas (209) and oxygen-depleted air (227), a gasification system (5) for generating syngas with the oxygen-enriched gas (209), a gas combustor (234) for reacting the syngas (224), and a subsystem configured to provide a first stream of air to the combustor (234) at a first pressure and to provide a second stream of air to the air separation unit (210) at a second pressure greater than the first pressure. The subsystem includes a compressor (230) having multi-pressure outlets (203, 204).

5 Claims, 3 Drawing Sheets

SYSTEM AND METHOD FOR GENERATION OF HIGH PRESSURE AIR IN AN INTEGRATED GASIFICATION COMBINED CYCLE SYSTEM

CROSS REFERENCE TO RELATED APPLICATIONS

This application is a division of U.S. application Ser. No. 11/600,708, filed Nov. 16, 2006, now U.S. Pat. No. 7,947,115 which is incorporated herein by reference.

FIELD OF THE INVENTION

The present invention relates generally to power generation systems, and more particularly, to integrated gasification combined cycle systems.

BACKGROUND OF THE INVENTION

Integrated Gasification Combined Cycle (IGCC) systems are an economically attractive alternative to Natural Gas Combined Cycle systems (NGCC), as the systems can use more abundant fuel sources such as coal or biomass. IGCC systems gasify the low heating value fuel and produce a mixture comprising hydrogen and carbon monoxide. IGCC systems also have greater potential for efficiency improvement and a decrease in undesirable emissions compared to conventional coal-fired steam power plants.

IGCC power plants having oxygen-blown gasifiers to generate syngas require a relatively pure stream of oxygen gas. Production of this oxygen supply can be achieved by various means. A well-known technique is the cryogenic air separation method, in which the partial pressure differences between oxygen and other air constituents is exploited at a very low temperature and an elevated pressure to effect phase differences that are used to separate the air components. One disadvantage of using cryogenic systems for oxygen separation is that the compression stage requires significant power consumption. This reduces the plant output and net efficiency. Another air separation technology involves use of an Ion Transport Membrane (ITM) to remove oxygen from a high temperature, pressurized air stream. The resulting ITM system output streams are: (i) an oxygen-enriched gas supply delivered at a high temperature and ambient pressure, and (ii) an oxygen-depleted air supply delivered at a high temperature and a high pressure. A compressor and an air pre-heater are generally employed to provide the high temperature, high pressure air stream, adding significant equipment installation and operational cost for deployment of the ITM technology in IGCC systems.

BRIEF DESCRIPTION OF THE DRAWINGS

Features of the invention will be best understood when the following detailed description is read in conjunction with the accompanying drawings, wherein.

In accord with common practice, the various described device features are not drawn to scale, but are drawn to emphasize specific features relevant to the invention. Like reference characters denote like elements throughout the figures and text.

DETAILED DESCRIPTION OF THE INVENTION

IGCC systems employing the ITM air separation technology require two compressed air streams, one for the ITM air separation process and one for combustion of the fuel mixture in a gas combustor. The ITM process requires compressed air, generally in the range of 150-500 psia. The gas combustor of the IGCC gas turbine system requires compressed air, generally in the range of 120 psia-475 psia. It is now recognized as advantageous to generate two compressed air streams from a single compressor. This approach, using, for example, a compressor having multipressure outlets, reduces capital equipment costs as well as the operational costs of IGCC systems.

In the past, high pressure oxygen-depleted air produced by the ITM has been injected into the fuel mixture entering the combustor of the IGCC gas turbine system. This facilitates temperature control and $NO_x$ emission reduction. The pressure of the oxygen-depleted air relative to the compressed air supplied to the ITM ASU is reduced, due to frictional losses in the ITM system and in return piping. The pressure of the depleted air as it is injected into the fuel flow is lower than the pressure of compressed air that is routed directly from the gas turbine compressor to the combustor. In order to equalize the pressure of the two streams, the higher pressure stream of air from the compressor has been throttled, but this results in a loss of gas turbine efficiency.

By way of example, to avoid this loss in efficiency, a compressor having multipressure outlets may be integrated with a gas turbine system and a gasification system. Two compressed air streams can be generated, each at a different pressure. The integrated system eliminates the need for throttling of the gas turbine compressor outlet stream that is routed to the combustor. The lower pressure air stream output from the compressor is mixed with the oxygen-depleted air from the ITM prior to introduction to the combustor.

Figure 1:
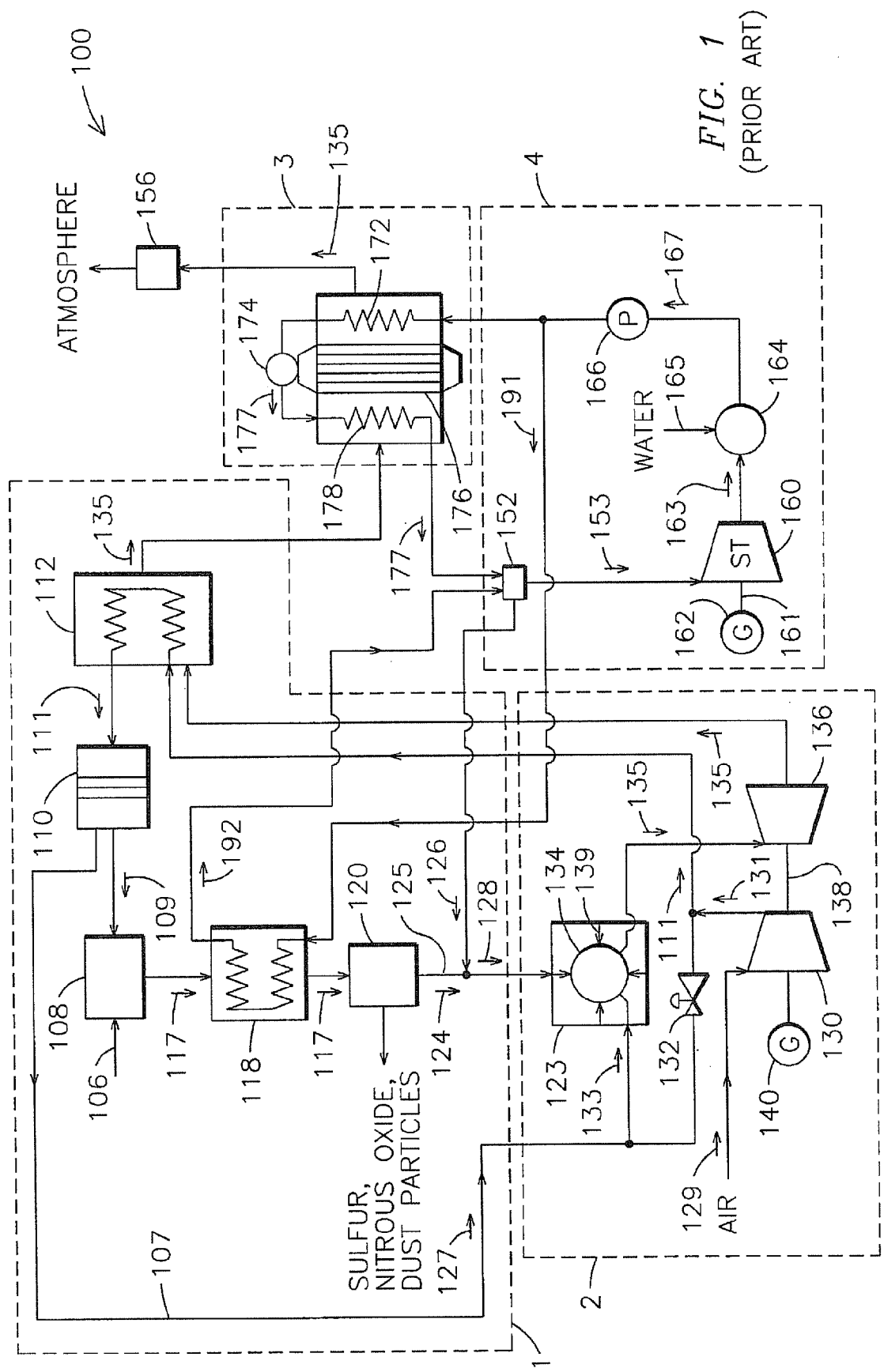
FIG. 1 is a schematic representation of a conventional Integrated Gasification Combined Cycle (IGCC) system.

A conventional IGCC system 100, shown in FIG. 1, comprises a gasification system 1, a gas turbine system 2, a heat recovery steam generator (HRSG) 3, and a steam turbine system 4. The gasification system 1 includes a carbonaceous fuel 106, such as a coal slurry, a gasifier 108 and an ITM Air Separation Unit (ASU) 110. The gas turbine system 2 includes an air-compressor 130, a throttle valve 132, a combustor 134, a gas turbine 136, and an electrical generator 140. The HRSG 3 comprises an economizer 172, a steam drum 174, an evaporator 176, and a super heater 178. The steam turbine system 4 includes a steam turbine 160, an electrical generator 162, a condenser 164 and a feed-water pump 166.

In the gasification system 1, oxygen 109, e.g., in an oxygen-enriched gas supply, is provided to the gasifier 108 from the ITM ASU 110. The ASU 110 produces oxygen-enriched gas 109 while operating in a temperature range of about 1300-1700° F. and with an oxygen partial pressure differential across an ion transport membrane of 160 to 285 psia. The compressor 130 in the gas turbine system 2 develops a stream of high pressure air 131 from ambient air 129. A portion 111 of the high pressure air 131 is delivered to the pre-heater 112, where the membrane operating temperature is achieved by heat exchange to extract sensible heat from one or more sources, including the hot gas 137 exiting the gas turbine 136. In the gasifier 108, the carbonaceous fuel 106 undergoes partial oxidation with the oxygen-enriched gas 109 to generate syngas 117, which primarily comprises carbon monoxide and hydrogen, in a highly exothermic reaction, generally in the temperature range of about 2000° F.-2800° F. To meet air quality requirements, impurities such as sulfides, nitrous components, and dust particles are removed in the gas clean-up unit 120. The syngas cooler 118 reduces the syngas temperature before introduction to the gas clean-up unit 120. The cooler 118 may, as illustrated, use a portion 191 of feed-water 167 from the steam turbine system 4 to recover the syngas heat. The steam 192 produced from the feed-water 191 by the syngas cooler 118 can be sent to the steam chest 152. The cleaned syngas 124 is mixed with steam 126 from the steam chest 152 to regulate the combustion process temperature, the internal combustor temperature profile, and the combustor exit temperature by varying the steam flow rate. The mixture 128 of steam 126 and syngas 124 flows through the fuel manifold 123 and into the combustor 134 of the gas turbine system 2.

In the gas turbine system, the compressed air 131 produced by the compressor 130 is mixed with oxygen-depleted air 127 from the ITM ASU 110, forming a high pressure air mixture 133 directed to the combustor 134. Mixing with oxygen-depleted air 127 helps to control the flame temperature and reduce the formation of $NO_x$ in the combustor 134. Due to frictional losses in the piping 107 and in the ITM ASU 110, the pressure of the oxygen-depleted air 127 can be lower than the pressure of the air stream 131 coming directly from the compressor 130. In order to prevent back-flow of oxygen-depleted air 127, the stream of pressurized air 131 exiting the compressor 130 is throttled by a valve 132, leading to a significant loss of gas turbine efficiency. The fuel mixture 128 entering the gas combustor 134 reacts with the high pressure air mixture 133 to produce a hot, pressurized gas 135 which powers gas turbine 136 and turns the rotor shaft 138 to drive both the compressor 130 and the electrical generator 140. As a result of having been expanded in the turbine 136, the temperature of the exhaust gas 135 from the turbine 136 is considerably lower than the temperature of the hot gas 135 entering the turbine 136. The exhaust gas 135, typically in the range of 850° F.-1100° F., is directed from the turbine 136 to the air pre-heater 112 of the gasification system 1 for transfer of sensible heat to the compressed air 111 supplied from the compressor 130. The cooled gas 135 exiting the pre-heater 112, still relatively hot (typically in the range of 750° F.-1000° F.), is sent to the HRSG 3 for further recovery of heat.

The HRSG 3 receives feed-water 167 sent from the steam turbine system 4 by the feed-water pump 166. The feed-water 167 is heated with heat transferred from the relatively hot gas 135 exiting the gas turbine system 2. The feed-water 167 first flows through the heat transfer tubes of the economizer 172, where its temperature is raised to near the boiling point and is then directed to the steam drum 174 from which the water is circulated through the heat transfer tubes of the evaporator 176 where the heated feed-water 167 is converted into saturated steam 177. The steam temperature is further elevated as it flows through the superheater 178 before entering the steam chest 152. After flowing through the HRSG 3, the cooled, expanded gas 135 is then discharged to atmosphere via a stack 156.

In the steam turbine system 4, steam 192 from the syngas cooler 118 of the gasification system 1 and steam 177 from the HRSG 3 are merged in the steam chest 152. Steam 153 flows from the steam chest 152 to the steam turbine 160 and steam 126 flows from the steam chest 152 to the fuel supply line 125 for entry to the fuel manifold 123 with the cleaned syngas 124 as the fuel mixture 128. Within the steam turbine 160, the steam 153 expands, turning the rotor shaft 161 to drive the electrical generator 162. In other designs, the steam turbine 160 may be coupled to the shaft 138 and generator 140 of the gas turbine system 2. After passing through the turbine 160 the cooled, expanded steam 163 enters the condenser 164 for recycling as feed-water 167. Fresh water 165 is supplied to the condenser 164 to compensate for water loss in the system 100.

Figure 2:
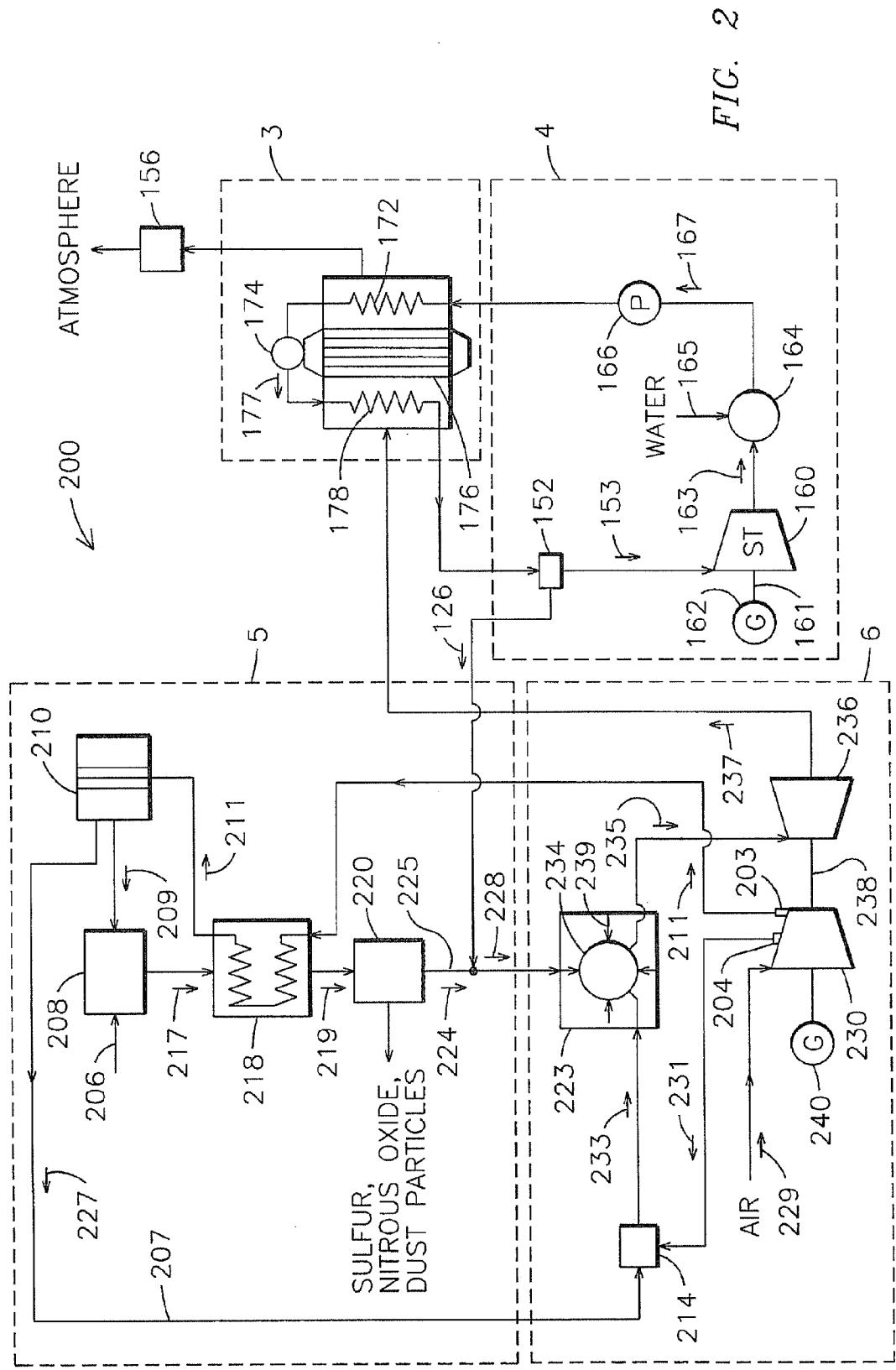
FIG. 2 is a schematic representation of an IGCC system according to an embodiment of the invention.

In the embodiment of FIG. 2, an IGCC system 200 generates compressed air 211 for an ITM process and compressed air 231 for combustion from a compressor 230 having multi-pressure outlets 203 and 204. The system 200 comprises a HRSG 3, and a steam turbine system 4 as described with respect to FIG. 1, a gasification system 5, and a gas turbine system 6.

The gasification system 5 includes a gasifier 208 which receives a fuel source 206 and an oxygen-enriched gas supply 209 from an ITM ASU 210. Syngas 217 produced in the gasifier 208 is sent to a syngas cooler 218 to reduce the syngas temperature prior to clean-up of impurities, e.g., sulfur, nitrous oxide, and dust particles in a gas clean-up unit 220. The cleaned syngas 224 is mixed with steam 126 from the steam chest 152 of the steam turbine system 4 to form a fuel mixture 228 which flows through the manifold 223 and passes through multiple ports 239 thereof, into the gas combustor 234 of the gas turbine system 2. A supply of compressed air 211 delivered to an ASU 210 first passes through a syngas cooler 218 where it receives sufficient heat from hot syngas 217 to elevate the temperature as required for ITM oxygen separation. After being separated from the air 213 in the ASU 210, oxygen-enriched gas 209 is delivered to a gasifier 208 and oxygen-depleted air 227 is delivered to an air chest 214 in the gas turbine system 6. Although not shown, the syngas cooler 218 may include an additional heat exchanger to generate steam from a portion of the feed-water 167.

Still referring to FIG. 2, the compressor 230 in the gas turbine system 6 receives ambient air 229 to generate the source of high pressure air 211 exiting the first outlet 203, generally in the range of 200-300 psia, and a source of low pressure air 231 exiting the second outlet 204, having substantially same pressure as the oxygen-depleted air 227, e.g., generally in the range of 160-285 psia. The high pressure stream of air 211 is extracted from a high pressure port 203 of the compressor 230 and is delivered to the syngas cooler 218 for heat exchange prior to entering the ITM ASU 210 for oxygen separation. The low pressure air stream 231 is routed to the air chest 214 where it is mixed with the oxygen-depleted air 227 traveling from the ASU 210 through a line 207, generating an air mixture 233. The air mixture 233 is delivered to the combustor 234 to react with the fuel mixture 228 to produce a hot, pressurized gas 235 which powers the gas turbine 236, turning the rotor shaft 238 to drive both the compressor 230 and the electrical generator 240. As a result of having been expanded in the turbine 236, the temperature of the exhaust gas 237 exiting from the turbine 236 is considerably lower than the temperature of the hot gas 235 entering the turbine 236. The exhaust gas 237, typically in the range of 850° F.-1100° F., is directed to the HRSG 3 for recovery of heat. After flowing through the HRSG 3, the cooled, expanded gas is discharged to the atmosphere via a stack 156.

Figure 3:
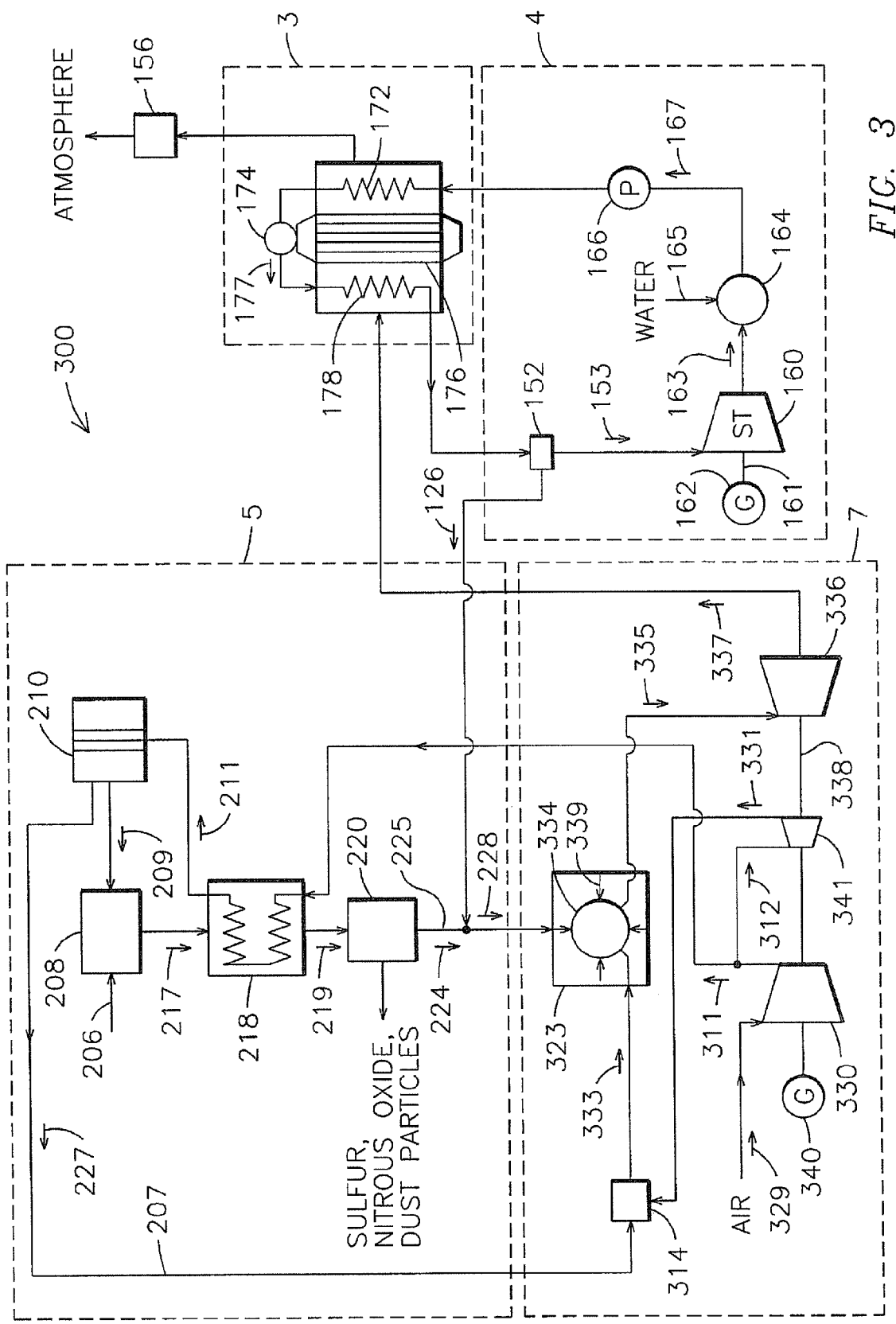
FIG. 3 is a schematic representation of an IGCC system according to another embodiment of the invention.

In the embodiment of FIG. 3, an IGCC system 300 generates a supply of low pressure compressed air 331 for combustion from a supply of high pressure compressed air 311 with an air turbine 341. The system 300 comprises a HRSG 3, a steam turbine system 4, a gasification system 5, each as described with respect to FIG. 1 and FIG. 2, and a gas turbine system 7.

In the gas turbine system 7, a compressor 330 generates a supply of high pressure air 311, generally at 200-300 psia.

The high pressure air 311 passes through the syngas cooler 218 in the gasification system 5 where it receives sufficient heat from hot syngas 217 to elevate the temperature as required for ITM oxygen separation in the ASU 210. After being separated from the air 213 in the ASU 210, oxygen-enriched gas 209 is delivered to the gasifier 208 in the gasification system 5 and oxygen-depleted air 227 is delivered to an air chest 314 in the gas turbine system 7. Although not shown, the syngas cooler 218 may include an additional heat exchanger to generate steam from a portion of the feed-water 167.

A portion 312 of the air 311 is delivered to the air turbine 341 to produce a stream of lower pressure air required for combustion in a combustor 334. The high pressure air 312 expands in the air turbine 341 and turns a rotor shaft 338 coupled to drive both the compressor 330 and the electrical generator 340. The air turbine 341, in other designs, may be coupled to a separate rotor shaft and a separate generator. The air 331 exiting the air turbine 341, generally at 160-285 psia, is routed to an air chest 314.

Pressurized, oxygen-depleted air 227 from the ITM ASU 210 of the gasification system 5 mixes with the air 331 in the air chest 314, providing an air mixture 333. The air mixture 333 is delivered to the combustor 334 to react with the fuel mixture 228 to produce a hot, pressurized gas 335 which powers a gas turbine 336, turning the rotor shaft 338 to drive both the compressor 330 and the electrical generator 340. As a result of having been expanded in the turbine 336, the temperature of the exhaust gas 337 exiting the turbine 336 is considerably lower than the temperature of the gas 335 entering the turbine 336. The exhaust gas 337 exiting from the turbine 336, typically in the range of 850° F.-1100° F., is directed to the HRSG 3 for recovery of heat. After flowing through the HRSG 3, the cooled, expanded gas is then discharged to the atmosphere via a stack 156.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as described in the claims.

The invention claimed is:

1. A method of operating an integrated gasification combined cycle power generation system, comprising the steps of:
    providing a compressor having at least two multi-pressure outlets;
    delivering a first stream of air at a first pressure from a first of the outlets and into a first line;
    delivering a second stream of air at a second pressure greater than the first pressure from a second of the outlets;
    producing a stream of oxygen-enriched gas and a stream of oxygen-depleted air from the second stream of air in an air separation unit, wherein both the oxygen depleted air and the first stream of air are each in a pressure range of 160 to 285 psia;
    generating syngas by reacting a carbonaceous fuel with the oxygen-enriched gas;
    positioning an air chest in-line between the first line which receives the first stream of air from the first outlet and a second line which carries output from the air chest to a combustor, whereby the air chest receives air at the first pressure from the first outlet of the compressor, which air passes through the air chest and then into the second line through which it is received into the combustor;
    sending at least a portion of the stream of oxygen-depleted air in a third line to the air chest for mixing in the air chest with the air of the first stream received from the first outlet;
    mixing the oxygen-depleted air with air of the first stream in the air chest to generate a first mixture in the air chest;
    delivering the first mixture from the air chest through the second line to the combustor; and
    combusting a second mixture comprising the syngas and air from the first mixture in the combustor to generate power.

2. A method of operating an integrated gasification combined cycle power generation system, comprising the steps of: producing a first stream of air at a first pressure at an outlet of a compressor; producing a stream of oxygen-enriched gas and a stream of oxygen-depleted air from a first portion of the first stream of air; producing a second stream of air at a second pressure lower than the first pressure from a portion of the first stream of air produced at the outlet of the compressor; generating syngas by reacting a carbonaceous fuel with the oxygen-enriched gas; and combusting a mixture comprising the syngas and air of the second stream of air in a combustor to generate power.

3. The method of claim 2, wherein the temperature of producing the streams of oxygen-enriched gas and oxygen-depleted air is in the range of 1300°-1700° F.

4. The method of claim 2, further including the step of providing at least a portion of the stream of oxygen-depleted air to the combustor.

5. The method of claim 4 wherein the step of providing at least a portion of oxygen-depleted air to the combustor comprises mixing the second stream of compressed air and the oxygen-depleted air in an air chest.

* * * * *